US011599612B2

(12) United States Patent
Kurylko et al.

(10) Patent No.: US 11,599,612 B2
(45) Date of Patent: Mar. 7, 2023

(54) METHOD, APPARATUS AND SYSTEM FOR AUTHENTICATING A USER BASED ON EYE DATA AND/OR FACIAL DATA (71) Applicant: MASTERCARD INTERNATIONAL INCORPORATED, Purchase, NY (US)

(72) Inventors: Marek Kurylko, Bloomfield, NJ (US); Eugene Reda, Little Falls, NJ (US); Joseph Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 461 days.

(21) Appl. No.: 16/802,042

(22) Filed: Feb. 26, 2020

(65) Prior Publication Data

US 2021/0264008 A1 Aug. 26, 2021

(51) Int. Cl.
*G06F 21/00* (2013.01)
*G06F 21/32* (2013.01)
*G02B 27/00* (2006.01)
*G06V 40/19* (2022.01)
*G06V 40/16* (2022.01)

(52) U.S. Cl.
CPC ......... *G06F 21/32* (2013.01); *G02B 27/0093* (2013.01); *G06V 40/174* (2022.01); *G06V 40/19* (2022.01)

(58) Field of Classification Search
CPC ............. G06F 21/32; G06F 2221/2133; G02B 27/0093; G06V 40/174; G06V 40/19; G06V 40/197
See application file for complete search history.

(56) References Cited

U.S. PATENT DOCUMENTS

| | | | | |
|---|---|---|---|---|
| 10,657,718 | B1* | 5/2020 | Miranda | G06T 19/006 |
| 2013/0005443 | A1* | 1/2013 | Kosta | A63F 13/20 |
| | | | | 463/25 |
| 2013/0044055 | A1* | 2/2013 | Karmarkar | G06F 21/32 |
| | | | | 345/158 |
| 2016/0085949 | A1* | 3/2016 | Peterson | G06V 40/197 |
| | | | | 726/19 |
| 2017/0318019 | A1* | 11/2017 | Gordon | G06V 40/10 |
| 2018/0314881 | A1* | 11/2018 | Sud | G06F 3/013 |
| 2019/0034606 | A1* | 1/2019 | Mapen | G06V 40/19 |
| 2020/0201965 | A1* | 6/2020 | Pacella | G06V 40/50 |

OTHER PUBLICATIONS

Apple, "ARFaceAnchor", Apple Developer Documentation, retrieved Dec. 20, 2019, 3 pages.

* cited by examiner

*Primary Examiner* — Jeffrey C Pwu
*Assistant Examiner* — William A Corum, Jr.
(74) *Attorney, Agent, or Firm* — Jordan IP Law, LLC (57) ABSTRACT

Systems, apparatuses and methods may provide for technology to identify image data, identify eye data from the image data, where the eye data includes one or more of an eye movement of a user or a point of gaze of the user on a display, and determine whether to authenticate the user based on the one or more of the eye movement or the point of gaze.

17 Claims, 8 Drawing Sheets

METHOD, APPARATUS AND SYSTEM FOR AUTHENTICATING A USER BASED ON EYE DATA AND/OR FACIAL DATA

FIELD

Exemplary embodiments relate generally to authentication, and, more particularly, apparatus to methods and systems for challenge-response authentication based on eye and/or facial responses.

BACKGROUND

Authentication on the internet is rapidly evolving to deter nefarious actors from abusing systems through various techniques, such as spamming, malicious bot accesses and impersonation of other individuals. Thus, authentication techniques may be implemented to reduce the potential of abuse by skilled fraudsters and bots, as well as to validate an identity of the user. As the sophistication of nefarious actors has increased, authentication techniques have also increased in difficulty to reduce abuse by the nefarious actors. In some cases, the techniques may have evolved to be cumbersome and/or user-hostile.

For example, an average consumer (e.g., a consumer who legitimately utilizes personal information and/or claims an identity) may be subjected to various tests that require inputting of authentication details to validate the user, such as Completely Automated Public Turing test to tell Computers and Humans Apart (CAPTCHA), user/password login identifications and/or Multifactor authentication (MFA) challenges, to authenticate the user. Such tests may be difficult to execute and fail to achieve a difficult balance between being understandable and vague. Moreover, such tests may include antiquated data. Further, an individual may have to manually input the appropriate responses (e.g., authentication details) to challenge questions and/or manually input passwords (e.g., utilize hands to input details). Doing so may compromise security as a nearby individual may observe the inputs and utilize the inputs at a later time to gain access to the user's accounts (e.g., "shoulder surfing."). Moreover, in some cases electronic keyboards on various devices (e.g., mobile devices) may make input frustrating and cumbersome as such electronic keyboards may shift on the display and be too compact for smooth entry of inputs.

Thus, providing authentication details for validation may be inefficient, cumbersome and tiresome for a customer. Further, providing authentication details may be error prone, redundant, and tiresome for the customer. In light of the foregoing, there exists a need for a solution for facilitating authentication in an enhanced, efficient clear and/or secure manner.

SUMMARY

Various embodiments of the present disclosure provide methods and systems for managing online transactions with enhanced security and stability.

Some embodiments relate to a computing device, comprising a network interface to transmit and receive data, and a processor communicatively coupled to the network interface, the processor configured to identify image data, identify eye data from the image data, wherein the eye data includes one or more of an eye movement of a user or a point of gaze of the user on a display, and determine whether to authenticate the user based on the one or more of the eye movement or the point of gaze.

Some embodiments relate to at least one computer readable storage medium comprising a set of instructions, which when executed by a computing device, cause the computing device to identify image data, identify eye data from the image data, wherein the eye data includes one or more of an eye movement of a user or a point of gaze of the user on a display, and determine whether to authenticate the user based on the one or more of the eye movement or the point of gaze.

Some embodiments relate to at a method comprising identifying image data, identifying eye data from the image data, wherein the eye data includes one or more of an eye movement of a user or a point of gaze of the user on a display and determining whether to authenticate the user based on the one or more of the eye movement or the point of gaze.

Other aspects and example embodiments are provided in the drawings and the detailed description that follows.

BRIEF DESCRIPTION OF THE DRAWINGS

The accompanying drawings illustrate various embodiments of systems, methods, and other aspects of exemplary embodiments. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments are illustrated by way of example, and not limited by the appended figures, in which like references indicate similar elements, and in which.

Further areas of applicability of exemplary embodiments will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

Exemplary embodiments are best understood with reference to the detailed figures and description set forth herein. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example" and so on, indicate that the embodiment (s) or example (s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

In various exemplary scenarios, a user may want to access data associated with an entity (e.g., a private business, governmental organization, etc.). The customer may attempt to access the data through an application of a computing device and/or website interface displayed on the computing device for example.

In order to protect the user and the entity, the user may undergo a challenge-response authentication. In doing so, the entity may be reasonably assured that an identity claimed by the user does belong to the user.

In order to execute the challenge-response authentication, the user may be prompted to respond to a request. The computing device may include at least one imaging device to track movements of the user. For example, the imaging device may include a camera. The computing device may be able to track movements of the user based on image data generated by the imaging device, and in particular eye and/or facial movements of the user. The user may move one or more of the eyes of the user or facial features of the user in order to provide a response. The user may be authenticated based on the eye movement and/or the facial features.

By doing so, security may be enhanced. For example, other challenge-response authentication processes may request a manual response (e.g., a response entered with the fingers). A nefarious actor may observe the manual response and store the manual response. The nefarious actor may now be able to access the user's sensitive information by simply providing the stored manual response to the appropriate website and/or application. It may however be more difficult for the nefarious actor to correctly observe eye movements of the user and/or facial expressions provided in association with a challenge.

Moreover, efficiency may be enhanced. For example, some computing devices may have limited capacity for manual inputs (e.g., small keyboards, electronic keyboards, limited screen space to display manual entry selections, etc). By enabling authentication with facial features and/or eye tracking, some embodiments may allow for a more efficient and less cumbersome process. For example, manual entry may take significantly longer to input than moving eyes and/or adjusting facial features. As such, computing power may be drained, and resources may be inefficiently dedicated to the manual response.

Furthermore, some users may have difficulty with manual entry. For example, a disabled individual may have limited usage of hands and/or dexterity, and thus may have difficulty typing a response. Thus, in some embodiments, providing responses with eyes and/or facial features may be far more efficient than a manual entry.

Thus, the methods and the systems, in accordance with various embodiments, facilitate authentication based on facial features and/or eye tracking. Reducing the manual entry of verification details may increase computing efficiency, reduce power consumption, enhance security and preserves valuable computing resources.

Terms Description (in Addition to Plain and Dictionary Meaning)

Server is a physical or cloud data processing system on which a server program runs. A server may be implemented in hardware or software, or a combination thereof. In one embodiment, the server includes a computer program that is executed on programmable computers, such as personal computers, laptops, or a network of computer systems. The server may correspond to a merchant server, an acquirer server, a payment network server, an issuer server, or a digital wallet server.

A challenge-response authentication process may be a process in which one party presents a question as a challenge, and another party must provide a valid answer as a response to be authenticated. Various examples may include CAPTCHA, user ID and password, challenge questions, etc.

A computing device may include any electronic devices and may include at least one computer readable storage medium comprising a set of instructions, which when executed by the computing device, cause the computing device to execute actions. The computing device may also include hardware elements (e.g., circuitry, fixed-function logic hardware, configurable logic, etc.) in addition to and/or instead of the at least one computer readable storage medium. In some embodiments, the computing device may be the same as the server.

Various exemplary embodiments have been further described in detail with reference to FIGS. 1 to 12.

Figure 1:
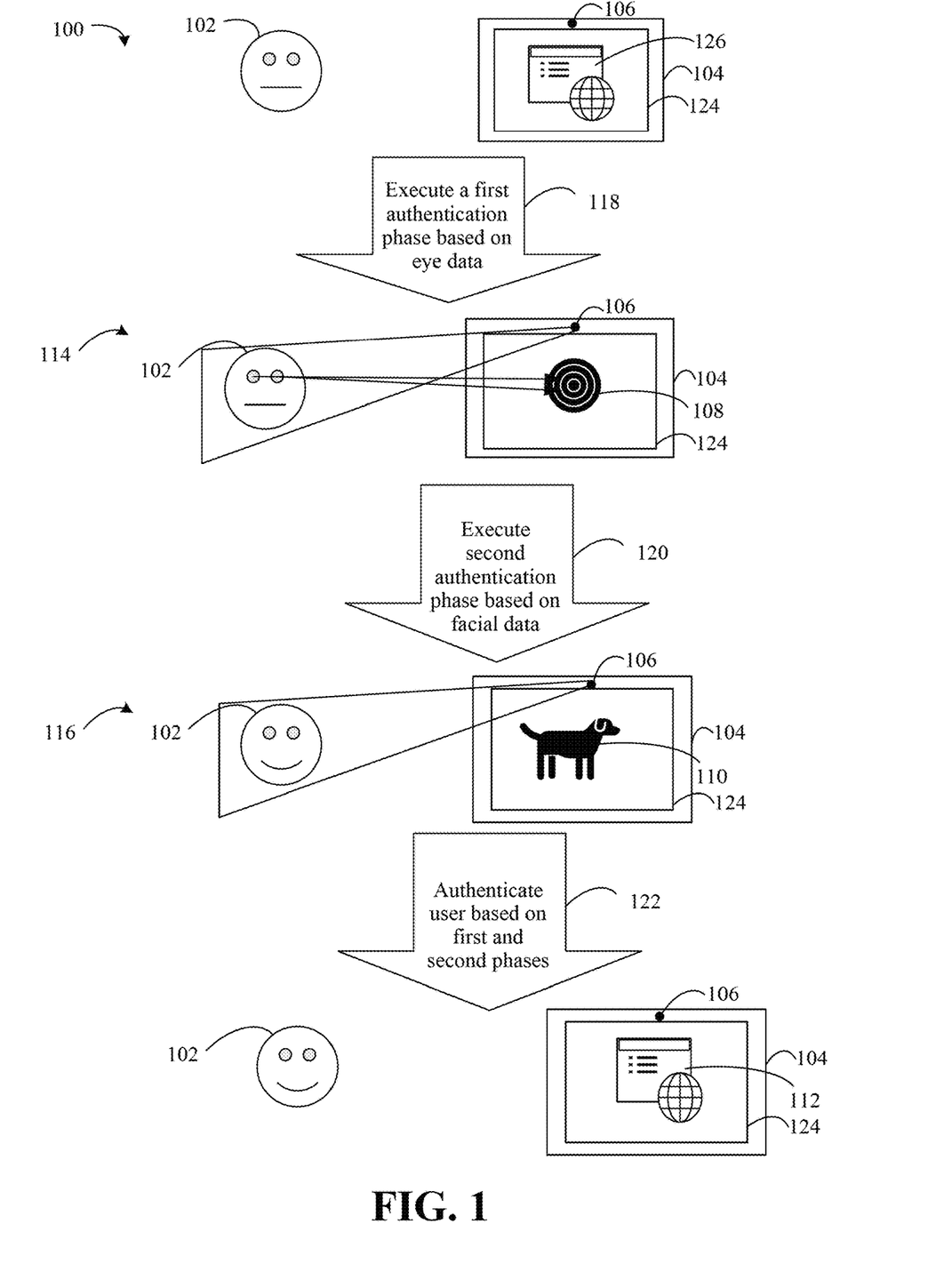
FIG. 1 illustrates a process to execute an enhanced challenge-response authentication in accordance with some embodiments.

FIG. 1 illustrates an enhanced challenge-response authentication process 100 to authenticate a user 102. The user 102 may execute the authentication process 100 with a computing device 104. The computing device 104 may be connected to remote servers that store data. The data may be associated with (e.g., belong to) one or more entities that manage the data and data accesses. In some embodiments, the user 102 may take an action (e.g., navigate to a specific webpage and/or initiate a specific function of an application) to access the data or functions on the servers. Prior to allowing access, the entities may cause the challenge-response authentication process 100 to execute. The challenge-response authentication process 100 may verify the identity of the user (e.g., the user is legitimately claiming the identity) and determine whether the user is allowed to access to the data.

The computing device 104 may display a webpage 126. It will be understood that while the webpage 126 is described, the challenge-response authentication process 100 may similarly execute with an application or any other medium that facilitates access to the entity's data and is capable of executing the challenge-response authentication process 100. For example, the webpage 126 may be replaced by an application or other medium, and the challenge-response authentication process 100 may still execute similarly to as described herein. The user 102 may request access to the data through the webpage 126. As noted, the data may be safeguarded and thus the user may need to execute a first authentication phase 114 and a second authentication phase 116 (described further below) before gaining access to the data. Thus, the process 100 may execute the first authentication phase 114 based on eye data 118.

During the first authentication phase 114, the computing device 104 may cause a target 108 to be presented. While the target 108 is presented, the computing device 104 may track a position of eyes of the user 102. For example, the computing device 104 may include an imaging device 106 (e.g., a high-fidelity camera such as a TrueDepth camera system) that images the user 102. The imaging device 106 may generate image data that includes images of the eyes of the user 102.

The computing device 104 may identify characteristics of the eyes of the user 102 based on the image data generated by the imaging device 106. For example, the characteristics may include where the user 102 is looking, a distance of focus of the eyes, a point of gaze of the user 102, whether the user 102 is blinking and so forth. In this particular example, the first authentication phase 114 may include the user 102 focusing the eyes on a particular position of display 124 of computing device 104. As mentioned above, the target 108 is presented to the user 102 on the display 124. The computing device 104 may identify whether the user 102 is focusing on the target 108 based on the image data of the imaging device 106. That is, the computing device 104 may conduct a comparison of the point of gaze of the user 102 to a position of the target 108.

For example, the computing device 104 may identify the point of gaze (where one is looking) of the user 102 and based on the image data. If the point of gaze is on the target 108 (e.g., a specific location), the user may be validated and successfully complete the first authentication phase 114. If, however the point of gaze is not on the target 108, the user may not be validated and thus, the first authentication phase 114 may be unsuccessful. Thus, the computing device 104 may set an authentication position on the display 124. The user 102 may be challenged to focus on the authentication position. In the above example for example, the authentication position is marked with the target 108 to indicate to the user 102 where the authentication position is located on the display 124. Thus, the target 108 may overlay the authentication position, and the eyes of the user 102 may be naturally drawn to the target 108 and the authentication position. The computing device 104 may detect whether the user 102 focuses on the authentication position and authenticate the user 102 if so. Otherwise, the user 102 may not be authenticated.

In some embodiments, the process 100 may allow for a tolerance. For example, if the point of gaze is within a threshold distance of the target 108 but outside the target 108, the computing device 104 may still deem the first authentication phase 114 to be successful.

The target 108 may be an image. In some embodiments, in addition to the target 108, other images may also be simultaneously presented on the display 124. The user 102 may have to pick a correct image, such as the target 108, by focusing the point of gaze on the portion of the display 124 that displays the correct image. For example, the user 102 may be challenged to pick an image of the logo of a credit card company and/or bank that the user 102 has an account. Several false answers (e.g., false logos) may be presented on the display 124 simultaneously with the correct answer (e.g., the correct logo). The correct logo may be the target 108, while the false answers may be presented away from the target 108. If the user 102 focuses on the target 108 (e.g., the correct logo), the user 102 may be authenticated. In some embodiments, the user 102 may be asked to spell out a challenge response correctly. In some embodiments, the correct image may be set ahead of time by the user 102 during a registration process.

In this particular example, the user 102 is successfully validated in the first phase. Thus, the process 100 executes a second authentication phase 116 based on facial data 120. For example, various AR software development kits (SDKs) may implement various functions to track and generate the facial data. The AR SDKs may be implemented by the computing device 104. Thus, to enhance security, the process may execute a two-tier authentication strategy. In the second phase 116, the user 102 may be presented with an image 110. The imaging device 106 may capture facial expressions of the user 102. For example, the imaging device 106 may generate image data that includes facial data associated with facial expressions (e.g., the facial data may correspond to facial reactions) of the user 102. The computing device 104 may identify a reaction (e.g., the facial expressions) of the user 102 based on the facial data.

The image 110 may be intended to invoke a facial expression (which may be referred to as a "response") from the user 102. For example, the image 110 may be intentionally blurry or obfuscated to provoke the user 102 into squinting (the facial expression). Thus, the image 110 may be associated with an expected facial reaction from the user 102. The computing device 104 may identify the reaction from the facial data. If the reaction matches an expected reaction (e.g., the facial data corresponds to an expected facial expression), the authentication may be deemed successful. If the reaction does not match an expected reaction, the authentication may be deemed unsuccessful.

In this particular example, the image 110 is a dog. For example, the user 102 may have provided an image of a dog during a registration process. The reaction (e.g., smiling) of the user 102 to the dog may be measured during the registration process and stored as an expected reaction. Thus, the dog may be stored in association with the measured reaction. It may be expected therefore that the user 102 will react similarly in the future to images of the dog.

During process 100, the dog may be presented to the user 102 on display 124. The facial data may indicate that the user 102 has a similar reaction (e.g., smiling) to the expected reaction stored during the registration process. Thus, because the reaction of the user 102 to the image 110 is similar (e.g., substantially the same or identical) to the expected reaction, the user 102 may be deemed to be validated during the second phase. In some embodiments, the computing device 104 may categorize the reaction (e.g., smiling, happy, etc.) and compare the categorized reaction to a category (e.g., smiling, happy, etc.) of the expected reaction. If the categories are the same, it may be deemed that the reaction matches the expected reaction. If the categories are different, it may be deemed that the reaction does not match the expected reaction. Thus, tolerance may be enabled during the categorization. For example, the user 102 may not be expected to present identical facial features every time the image 110 is presented. The user 102 may however present similar reactions (e.g., large smile, small smile, eyes widening to indicate recognition) to the image 110 every time the image 110 is shown.

In some embodiments, a series of images 110 may be presented to the user 102. The series of images 110 may include one or more false images that are not expected to elicit a certain category of reaction (e.g., smiling) by the user 102, and one or more true images that may be expected to elicit the category of the reaction from the user 102. The user 102 may be authenticated if the user 102 does not exhibit the certain category of reaction while the one or more false images are presented on the display 124 and exhibits the category when the one or more true images are presented on the display 124.

In this particular example, process 100 authenticates the user 102 based on the first and second authentication phases 114, 116, 122. Therefore, the user 102 may access data 112 associated with the entity. The data 112 may be of any type, and may include personal data (e.g., credit card statements, bank accounts, etc.) of the user 102, work related data, business related data and so forth. The data 112 may also include publicly available information not directly associated with the user 102. Although first and second authentication phases 114, 116 are described above, it is worthwhile to note that only one authentication phase may be executed in some embodiments. For example, some embodiments may only include the first authentication phase 114, and other embodiments may include only the second authentication phase 116.

In some embodiments, the first and second authentication phases 114, 116 may be executed concurrently by simultaneously displaying images. In some embodiments, the user 102 may be challenged to identify a familiar image (e.g., a picture of a child) that elicits an emotional response from the user 102. The familiar image may be displayed with a plurality of other unfamiliar images on the display 124, and the user may be challenged to identify the familiar image. If the user 102 selects the familiar image and also provides the expected facial response (e.g., smile and/or eyes widening in recognition), the first and second authentication phases 114, 116 may be considered satisfied to authenticate the user 102.

Furthermore, in some embodiments described above, the image 110 was described as being registered by the user 102. In some embodiments however, the image 110 may not be registered by the user 102. Rather, generic photos (e.g., babies smiling, cats playing, beach settings) that are predicted to provoke a reaction (e.g., happy, relaxed, etc.) from most people may be provided. If the user 102 exhibits a typical reaction to the image 110 (e.g., a reaction that is observed in most people when showed the image 110), the user 102 may be authenticated and validated in the second authentication phase 116.

In some embodiments, the imaging device 106 may further include an infrared emitter that projects a series of dots (e.g., over 30,000 dots) in a known pattern onto the user's face. Those dots are then photographed by a dedicated infrared camera of the imaging device 106 for analysis.

Furthermore, the computing device 104 may include a proximity sensor that is leveraged in an activation method to alert the computing device 104 that a user is looking at the computing device 104. The computing device 104 may include Augmented Reality software development kits (SDKs) to collect information about the pose, topology and expression of a face that ARKits detect from a camera feed of the imaging device 106.

As described above, various AR SDKs on the computing device 104 may execute certain functions of the process 100. For example, to track face position and orientation, an inherited transform (e.g., a matrix encoding the position, orientation, and scale of an anchor relative to the world coordinate space of the AR session the anchor is placed in) property describes the face's current position and orientation in world coordinates; that is, in a coordinate space relative to that specified by the worldAlignment (e.g., a value specifying how the session maps real-world device motion into a 3D scene coordinate system) property of the session configuration. The transform matrix may be used to position virtual content to "attach" to the face in of an AR scene. The transform matrix further creates a face coordinates system for positioning other elements relative to the face. Units of face coordinate space may be in meters, with the origin centered behind the face as indicated in the figure below. The coordinate system may be right-handed—the positive x direction points to the viewer's right (that is, the face's own left), the positive y direction points up (relative to the face itself, not to the world), and the positive z direction points outward from the face (toward the viewer).

The AR SDKs may include a function to use face topology. For example, the geometry (e.g., a coarse triangle mesh representing the topology of the detected face) property provides an "ARFaceGeometry" (e.g., a 3D mesh describing face topology used in face-tracking AR sessions) object representing detailed topology for the face, which conforms a generic face model to match the dimensions, shape, and current expression of the detected face. The model may be the basis for overlaying content that follows the shape of the user's face—for example, to apply virtual makeup or tattoos. The model may be used to create occlusion geometry—a 3D model that doesn't render any visible content (allowing the camera image to show through), but that obstructs the camera's view of other virtual content in the scene. The AR SDKs may further track facial expressions. For example, the "blendShapes" (e.g., a dictionary of named coefficients representing the detected facial expression in terms of the movement of specific facial features) property provides a high-level model of the current facial expression, described via a series of many named coefficients that represent the movement of specific facial features relative to their neutral configurations. This may be used to blend shape coefficients to animate 2D or 3D content, such as a character or avatar, in ways that follow the user's facial expressions. The above functions may identify variable related to eye tracking that may be used in the processes and methods described herein.

Figure 2:
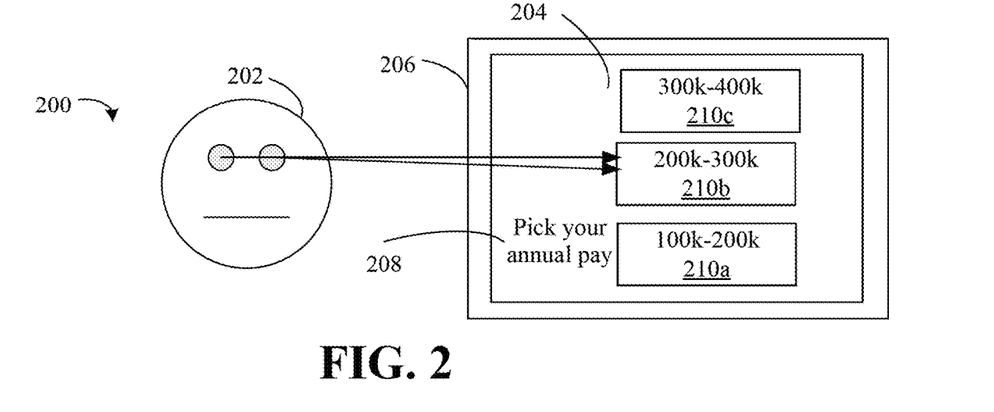
FIG. 2 illustrates a process to execute a personal question authentication process in accordance with some embodiments.

FIG. 2 illustrates personal question authentication process 200 that may be readily utilized as the first authentication phase 114 illustrated in process 100. In some embodiments, process 200 may be included as the second authentication phase 116 in addition to or instead of the first authentication phase 114. In this particular example, computing device 206 prompts user 202 to pick their annual pay 208. The computing device 206 may present several prepopulated pay categories 210a-210c on display 204. The user 202 may then adjust the point of gaze of the user 202 onto the correct pay category 210b to select the correct annual pay for the user 102 from the prepopulated pay categories 210a-210c.

It is worthwhile to note that the user 202 may have provided various details (e.g., personal data) of the user 202, such as the annual pay of the user 202, during a registration process. The various details may then be used during authentication processes to verify the identity of the user 202. In some embodiments, the user 202 may not necessarily need to provide the pay category during a registration process, but rather the computing device 206 (or an associated server) may retrieve the annual pay from a database (e.g., IRS tax record database) associated with the user 202.

In this particular example, the user 202 may select the correct category 210b with the eyes of the user 202. As already described, the computing device 206 may track eye movements of the user 202 to identify the point of gaze of the user 202. The computing device 206 may identify the point of gaze of the user 202. The computing device 206 may further determine that a position of the point of gaze on the display 204 is on the area that the correct category 210b is presented on the display 204, and thus determine that the user 202 selects the correct category. The computing device 206 may authenticate the user 202 based on the correct category 210b being selected by the point of gaze. Thus, process 200 may verify an identity of the user 202 to verify that the user 202 is legitimately attempting to access data associated with the user 202.

It is worthwhile to note that security may be enhanced since a manual entry (e.g., an input provided with the hands) may not be necessary to select the correct category 210b. For example, a "shoulder surfer" may have more difficulty identifying where the user 202 is looking at the display 204 to select the correct category 210b, as opposed to a manual input by the user 202 on the display 204 to select the correct category 210b.

Figure 3:
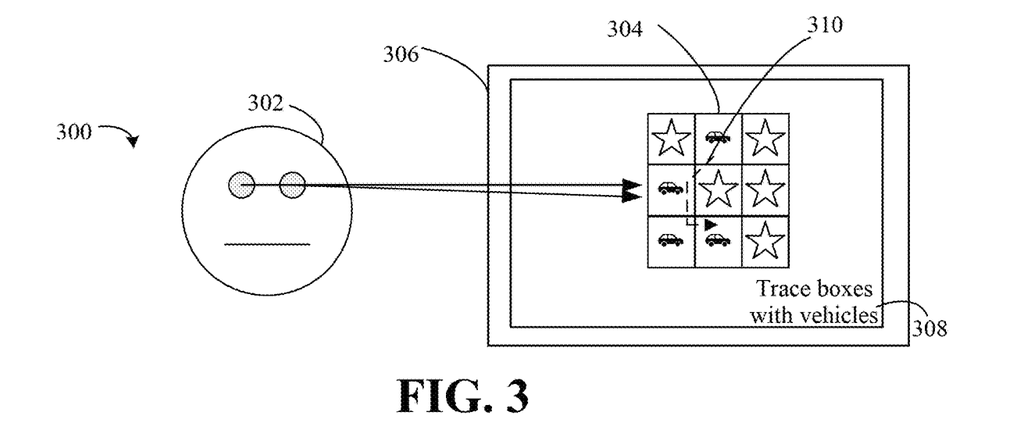
FIG. 3 illustrates a process to execute a personal question authentication process in accordance with some embodiments.

FIG. 3 illustrates an example of a path tracing challenge authentication process 300 that may be readily utilized as the first authentication phase 114 illustrated in process 100. In some embodiments, process 300 may be included as the second authentication phase 116 in addition to or instead of the first authentication phase 114. In this particular example, the computing device 306 may provide a grid 304 that includes boxes including star and vehicle objects. The computing device 306 prompts the user 302 to trace the boxes with vehicles 308 from the grid 304.

The user 302 may then select the boxes with vehicles from the grid 304 with the eyes of the user 302. The computing device 306 may track the eyes of the user 302 as already described. The computing device 306 may track eye movements of the user 302 to identify the point of gaze of the user 302. The user 302 may trace path 310 with the eyes of the user 302 to be authenticated. The computing device 306 may conduct a companion of the path 310 to an expected path (e.g., a path that traces through the vehicles) to verify the user 302. In this particular example, the user 302 may not need to execute a registration process in advance. The process 300 may be verify that the user 302 is a human for example.

Figure 4:
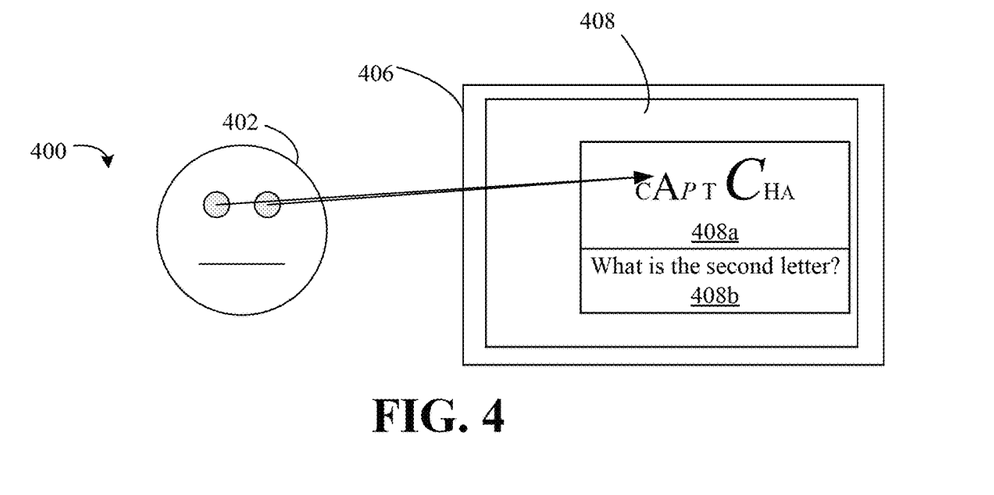
FIG. 4 illustrates a process to execute a point of gaze challenge authentication process in accordance with some embodiments.

FIG. 4 illustrates an example of a point of gaze challenge authentication process 400 that may be readily utilized as the first authentication phase 114 illustrated in process 100. In some embodiments, process 400 may be included as the second authentication phase 116 in addition to or instead of the first authentication phase 114. In this particular example, computing device 406 prompts the user 402 to identify the second letter 408b. The computing device 406 may provide a CAPTCHA 408a that includes a series of differently oriented letters in different sizes to reduce inappropriate bot accesses. The computing device 406 may monitor the user 402 to identify whether the user 402 selects the correct answer (e.g., focuses the eyes on the letter "A").

The user 402 may then select the second letter from the CAPTCHA 408a with the eyes of the user 402. The computing device 406 may track the eyes of the user 402 as already described. The computing device 406 may track eye movements of the user 402 to identify the point of gaze of the user 402. The user 402 may focus the point of gaze on the second letter of the CAPTCHA 408a which is the letter "A." The computing device 406 may identify that the point of gaze is on the letter "A" on the display 408. Since the point of gaze corresponds to an expected and correct position on the display 408 (e.g., a position of the letter "A") the user 402 may be authenticated. In this particular example, the user 402 may not need to execute a registration process in advance. The process 400 may be verify that the user 402 is a human for example.

Figure 5:
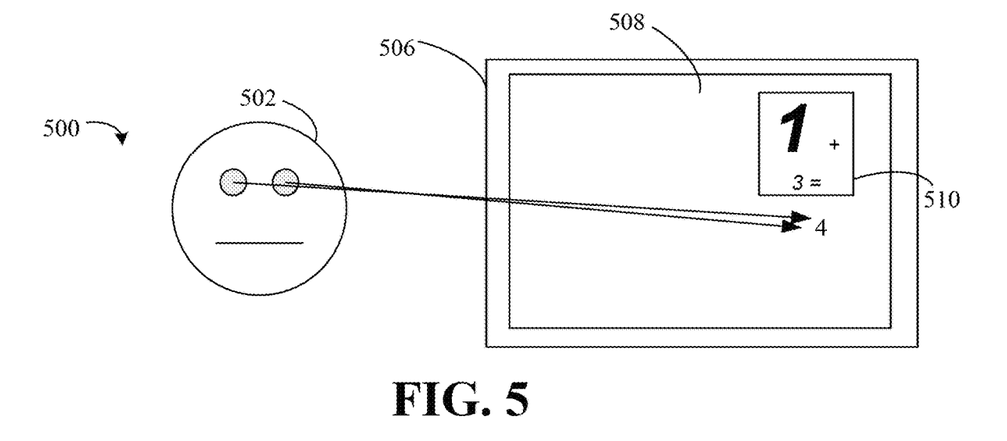
FIG. 5 illustrates a process to execute a numerical challenge CAPTCHA authentication process in accordance with some embodiments.

FIG. 5 illustrates an example of a numerical challenge CAPTCHA authentication process 500 that may be readily utilized as the first authentication phase 114 illustrated in process 100. In some embodiments, process 500 may be included as the second authentication phase 116 in addition to or instead of the first authentication phase 114. In this particular example, computing device 506 prompts the user 502 to add two number together. The computing device 506 may provide a CAPTCHA 510 on display 508 that includes a series of differently oriented numbers in different sizes to reduce inappropriate bot accesses. The CAPTCHA may include the question "1+3=". The user 502 may need to trace (e.g., trace a path with eyes) to form the appropriate reply ("4") in an appropriate area (adjacent to the equal sign) with the eyes of the user 502 to authenticate.

The user 502 may trace the correct answer "4" with the eyes of the user 502. The computing device 506 may track the eyes of the user 502 as already described. The computing device 506 may track eye movements of the user 502 to identify a path of movement of the point of gaze of the user 502. The path may resemble the number "4." Since the path resembles the approximate shale of the number "4," the computing device 506 may authenticate the user 502. In this particular example, the user 502 may not need to execute a registration process in advance. The process 500 may be verify that the user 502 is a human for example.

Figure 6:
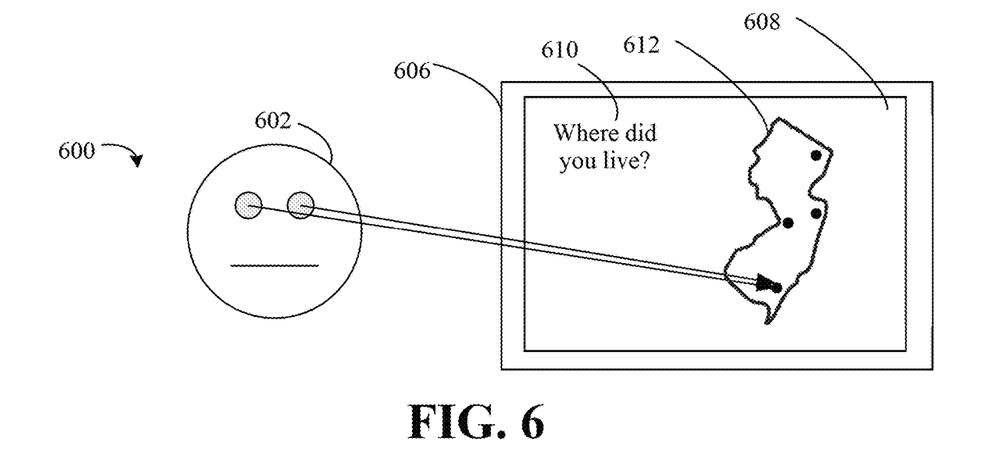
FIG. 6 illustrates a process to execute a personal challenge question authentication process in accordance with some embodiments.

FIG. 6 illustrates an example of a personal challenge question authentication process 600 that may be readily utilized as the first authentication phase 114 illustrated in process 100. In some embodiments, process 600 may be included as the second authentication phase 116 in addition to or instead of the first authentication phase 114. In this particular example, computing device 606 prompts the user 602 to select a location that the user lived 610. The computing device 606 may provide a map 612 on display 608 that includes one location that the user actually resided (or does reside) and several false answers.

The user 602 may then select the location on the map 612 with the eyes of the user 602. The computing device 606 may track the eyes of the user 602 as already described. The computing device 606 may track eye movements of the user 602 to identify the point of gaze of the user 602. The user 602 may select the lower location on the map 612 with the eyes of the user 602 to be authenticated.

In this particular example, the user 602 may execute a registration process in advance to identify the correct location. In some embodiments, the user may not necessarily need to provide the location, but rather the computing device

606 may retrieve the location from a database (e.g., IRS database, state records, etc.) associated with the user 602. Thus, process 600 may verify the identity of the user 602 and that data accesses requested by the user 602 are legitimate. As such, process 600 may cause personal data to be presented to the user 602 on the display 608 at a display position such as the bottom position and authenticate the user 602 based on the point of gaze and the display position.

Figure 7:
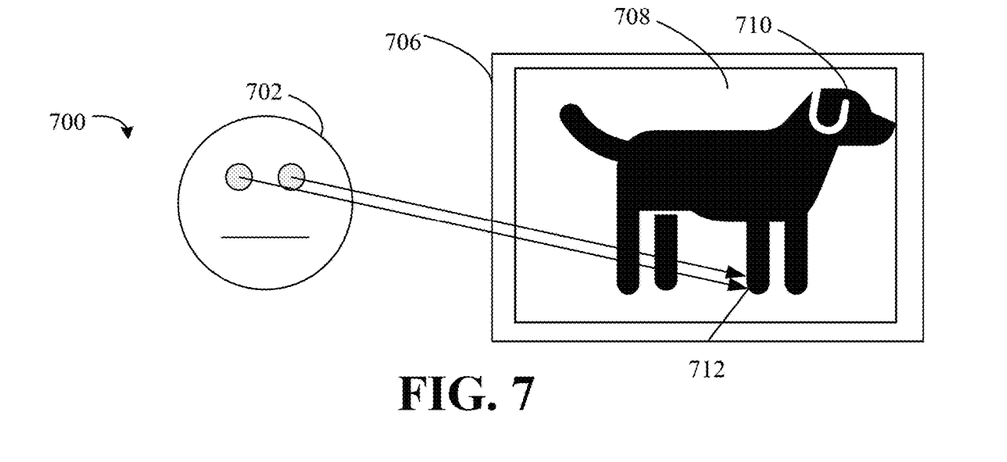
FIG. 7 illustrates a process to execute a personal image authentication process in accordance with some embodiments.

FIG. 7 illustrates an example of a personal image authentication process 700 that may be readily utilized as the first authentication phase 114 illustrated in process 100. In some embodiments, process 700 may be included as the second authentication phase 116 in addition to or instead of the first authentication phase 114. In this particular example, computing device 706 presents an image of an image 710 on display 708. The image 710 is a dog in this example. The image 710 may be associated with the user 702. For example, during a registration process, the user 702 may select the dog as an image. The user 702 may then select a specific location to gaze at the dog for future verification purposes, such as the location 712.

In this particular example, the user 702 may focus the point of gaze on the location 712. The computing device 706 may track eye movements of the user 702 to identify that the point of gaze of the user 702 is on the location 712. The computing device 706 may authenticate the user 702 based on the point of gaze being on the location 712 (e.g., the same location as the specific location selected during the registration process). Thus, process 700 may verify the identity of the user 702.

Figure 8:
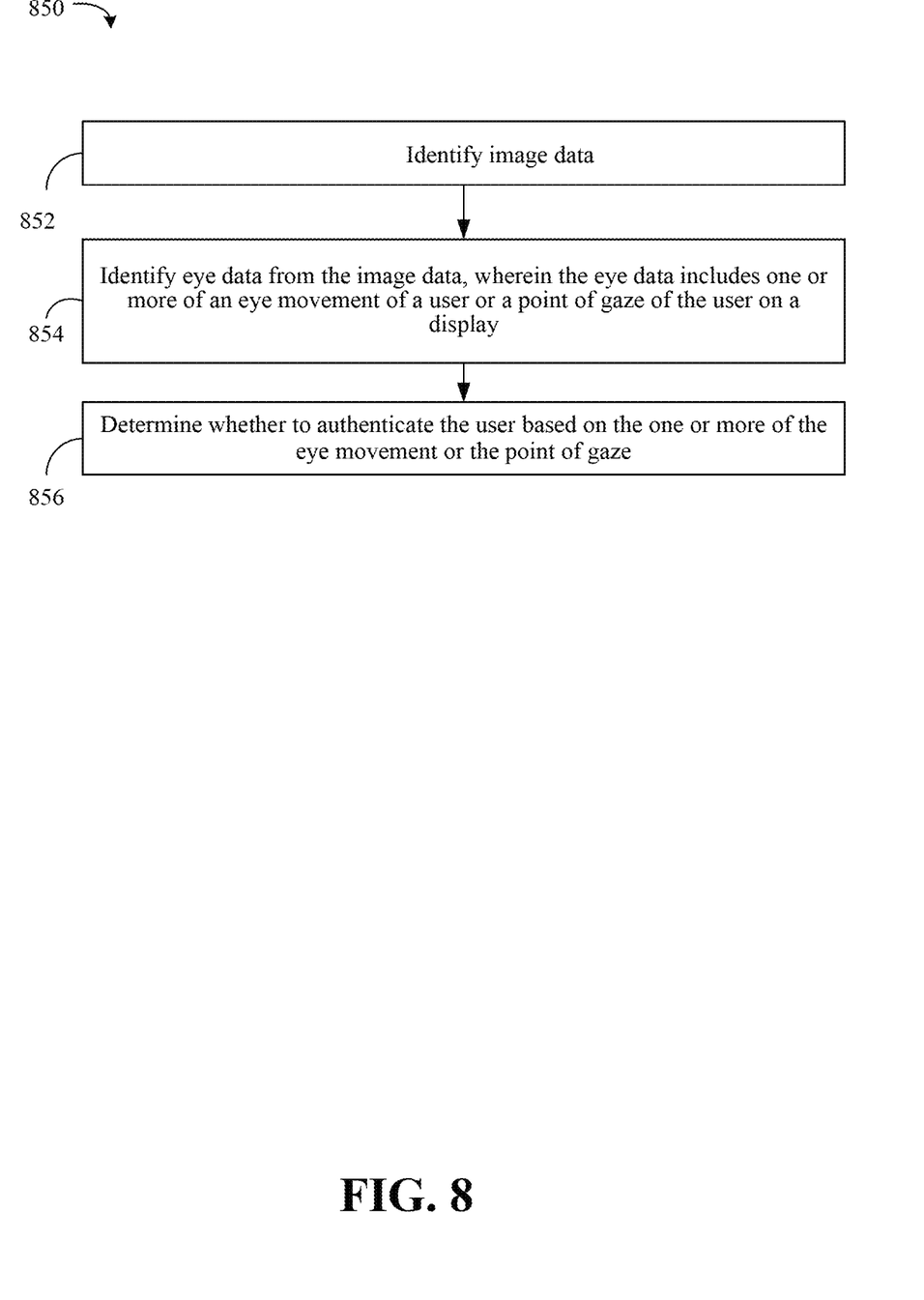
FIG. 8 is a process flow diagram that illustrates a method for authenticating a user, in accordance with some embodiments.

FIG. 8 is a method 850 that illustrates authenticating a user, in accordance with an embodiment. Method 850 may be implemented in at least one computer readable storage medium comprising a set of instructions, which when executed by a computing device, cause the computing device to execute the following steps. In some embodiments, method 850 may be executed by hardware elements (e.g., circuitry, fixed-function logic hardware, configurable logic, etc.). In some embodiments, method 850 may be implemented in combinations of hardware elements and software. Method 850 may be implemented by a computing device for example.

Illustrated processing block 852 identifies image data. Illustrated processing block 854 identifies eye data from the image data. The eye data includes one or more of an eye movement of a user or a point of gaze of the user on a display. Illustrated processing block 856 determines whether to authenticate the user based on the one or more of the eye movement or the point of gaze.

Figure 9:
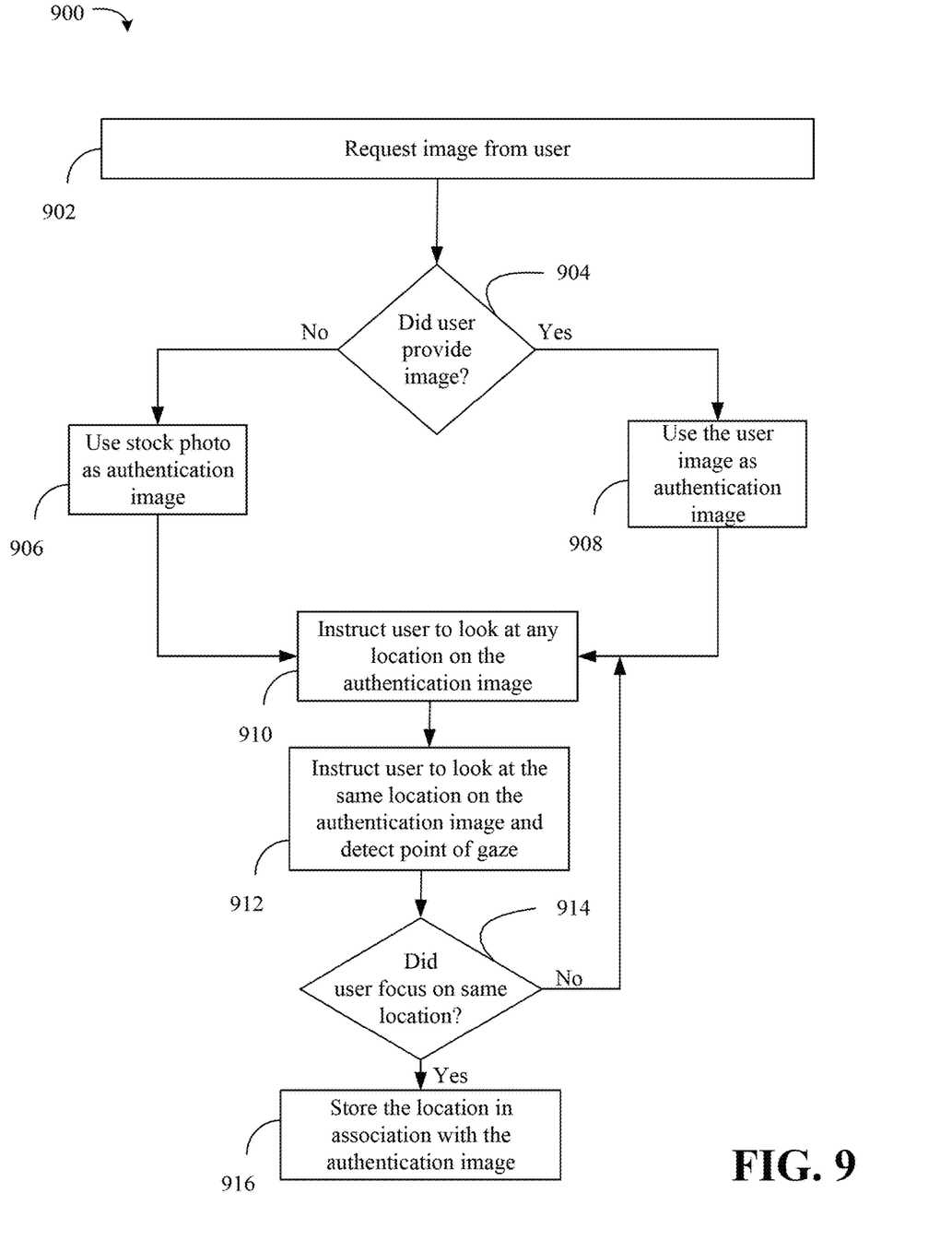
FIG. 9 is a process flow diagram that illustrates a method for a user registration process, in accordance with some embodiments.

FIG. 9 is a method 900 that illustrates a user registration process in accordance with an embodiment. Method 900 may be implemented in at least one computer readable storage medium comprising a set of instructions, which when executed by a computing device, cause the computing device to execute the following steps. In some embodiments, method 900 may be executed by hardware elements (e.g., circuitry, fixed-function logic hardware, configurable logic, etc.). In some embodiments, method 900 may be implemented in combinations of hardware elements and software. Method 900 may be implemented by a computing device for example. The embodiments of FIG. 9 may be used in conjunction with any of the embodiments described herein.

Illustrated processing block 902 requests an image from a user. The image may be a personal image that the user may readily identify (e.g., a picture of a pet, child, relative, vacation location, etc.). Illustrated processing block 904 detects if the user provided the image. If not, illustrated processing block 906 uses a stock photo as an authentication image. Otherwise, illustrated processing block 908 uses the user image as the authentication image. Illustrated processing block 910 instructs the user to look at any location on the authentication image. The location maybe used for future verification (authentication) processes. For example, a future verification may be executed by ensuring that the user is gazing at the same location on the authentication image as the location on the authentication image that is set during the method 900.

Illustrated processing block 912 instructs the user to look at the same location on the authentication image and detects the point of gaze. For example, illustrated processing block 912 may include moving the image and/or resizing the image. The user may then be prompted to focus on the same location on the image, and the and the point of gaze may be detected. Doing so may ensure that the user understands the selected location and is able to select the location again with the eyes of the user. Illustrated processing block 914 detects whether the user was focused on the same location during processing block 912 and based on the detected point of gaze. If the detected point of gaze was not on the same location, illustrated processing block 910 may re-execute so that the user may select another location. Otherwise, illustrated processing block 916 may store the location in association with the authentication image.

The location and authentication image may be used to authenticate the user in the future. For example, the user may be identified (e.g., facial recognition or username input), and then the image may be presented. The user may be authenticated when the user gazes at the location to allow access to sensitive information of the user. The method 900 may be executed by an entity that stores the sensitive information.

Figure 10:
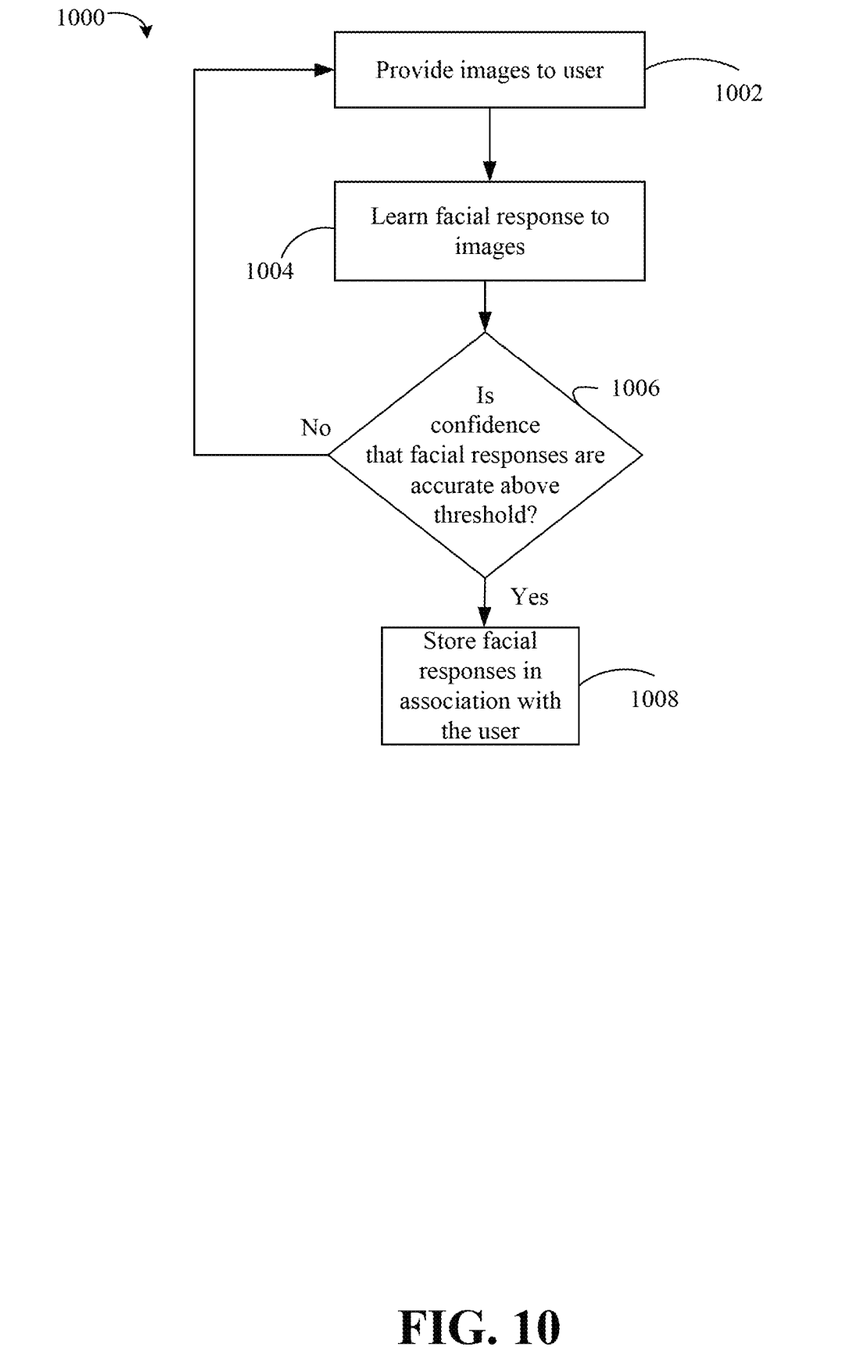
FIG. 10 is a process flow diagram that illustrates a method for machine learning facial responses, in accordance with some embodiments.

FIG. 10 is a method 1000 that illustrates machine learning facial responses in accordance with an embodiment. Method 1000 may be implemented in at least one computer readable storage medium comprising a set of instructions, which when executed by a computing device, cause the computing device to execute the following steps. In some embodiments, method 1000 may be executed by hardware elements (e.g., circuitry, fixed-function logic hardware, configurable logic, etc.). In some embodiments, method 1000 may be implemented in combinations of hardware elements and software. Method 1000 may be implemented by a computing device for example.

Illustrated processing block 1002 provides images to the user. Illustrated processing block 1004 learns facial responses (e.g., smiling, blink, frown, etc.) to the images. For example, the user may be identified as smiling, sad, upset, provoked, angry, etc. in response to certain pictures. Illustrated processing block 1006 identifies whether the confidence that the facial responses are accurate is above a threshold to ensure that the computing device accurately detects facial responses of the user. For example, the computing device may predict a facial response of the user to images. The user may verify if the predictions are correct and/or incorrect. The confidence may be based on the number of accurate and/or inaccurate predictions. If the confidence is not above the threshold, the machine learning may continue in processing block 1002. Otherwise, illustrated processing block 1008 may store the emotional responses in association with the user.

The emotional responses may be used during authentication (e.g., the second authentication phase 116 of FIG. 1). For example, the user may be presented with an image during authentication. The computing device may predict a reaction of the user to the image. If the computing device determines based on facial data that the user exhibits the reaction, the user may be authenticated. Otherwise, the user may be asked to verify in another manner (e.g., password login or one-time pin verification).

In some embodiments, the method 1000 may execute over a large span of users to identify expected facial responses. In such embodiments, the machine learning model may be applicable to authentication processes for a large number of users, not just the span of users that trained machine learning model.

Figure 11:
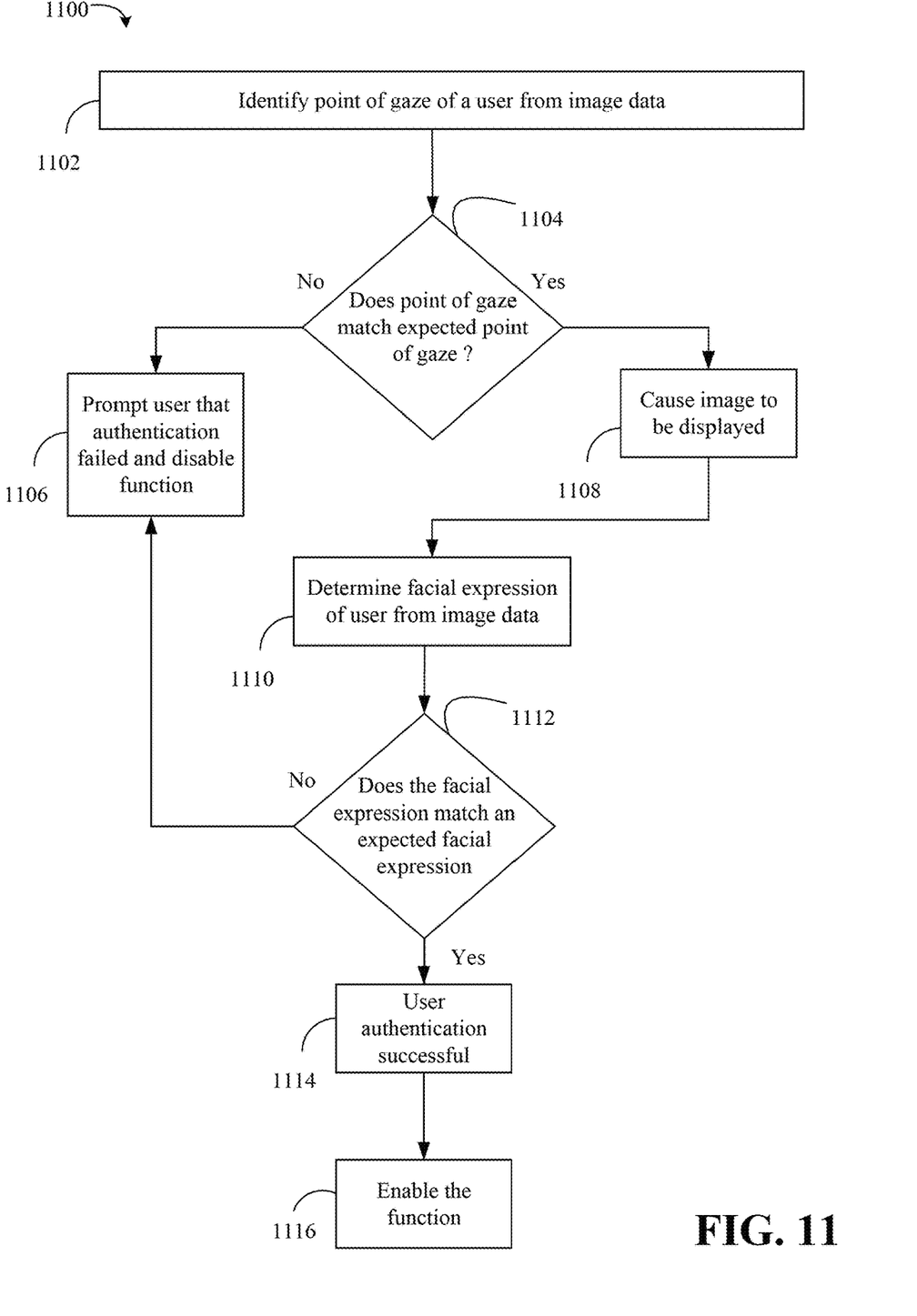
FIG. 11 is a process flow diagram that illustrates an authentication of a user, in accordance with some embodiments.

FIG. 11 is a method 1100 that illustrates authentication of a user in accordance with an embodiment. Method 1100 may be implemented in at least one computer readable storage medium comprising a set of instructions, which when executed by a computing device, cause the computing device to execute the following steps. In some embodiments, method 1100 may be executed by hardware elements (e.g., circuitry, fixed-function logic hardware, configurable logic, etc.). In some embodiments, method 1100 may be implemented in combinations of hardware elements and software. Method 1100 may be implemented by a computing device for example.

Illustrated processing block 1102 identifies a point of gaze of a user from image data. Illustrated processing block 1104 determines if the point of gaze matches an expected point of gaze. The expected point of gaze may be a correct answer to a challenge (e.g., where did you previously reside on this map, trace all vehicles in this grid, etc.). If not, illustrated processing block 1106 prompts the user that authentication failed and disallow a function (e.g., accesses to certain data). If the point of gaze matches the expected point of gaze, illustrated processing block 1108 causes an image to be displayed. The user may have registered the image during a registration process. Illustrated processing block 1110 determines facial expressions of a user from the image data and that is provided in response to the displayed image. Illustrated processing block 1112 determines if the facial expression matches an expected facial expression. If not, processing block 1106 executes. If so, illustrated processing block 1114 determines that the user authentication is successful. Illustrated processing block 1116 enables the function based on the successful authentication.

Figure 12:
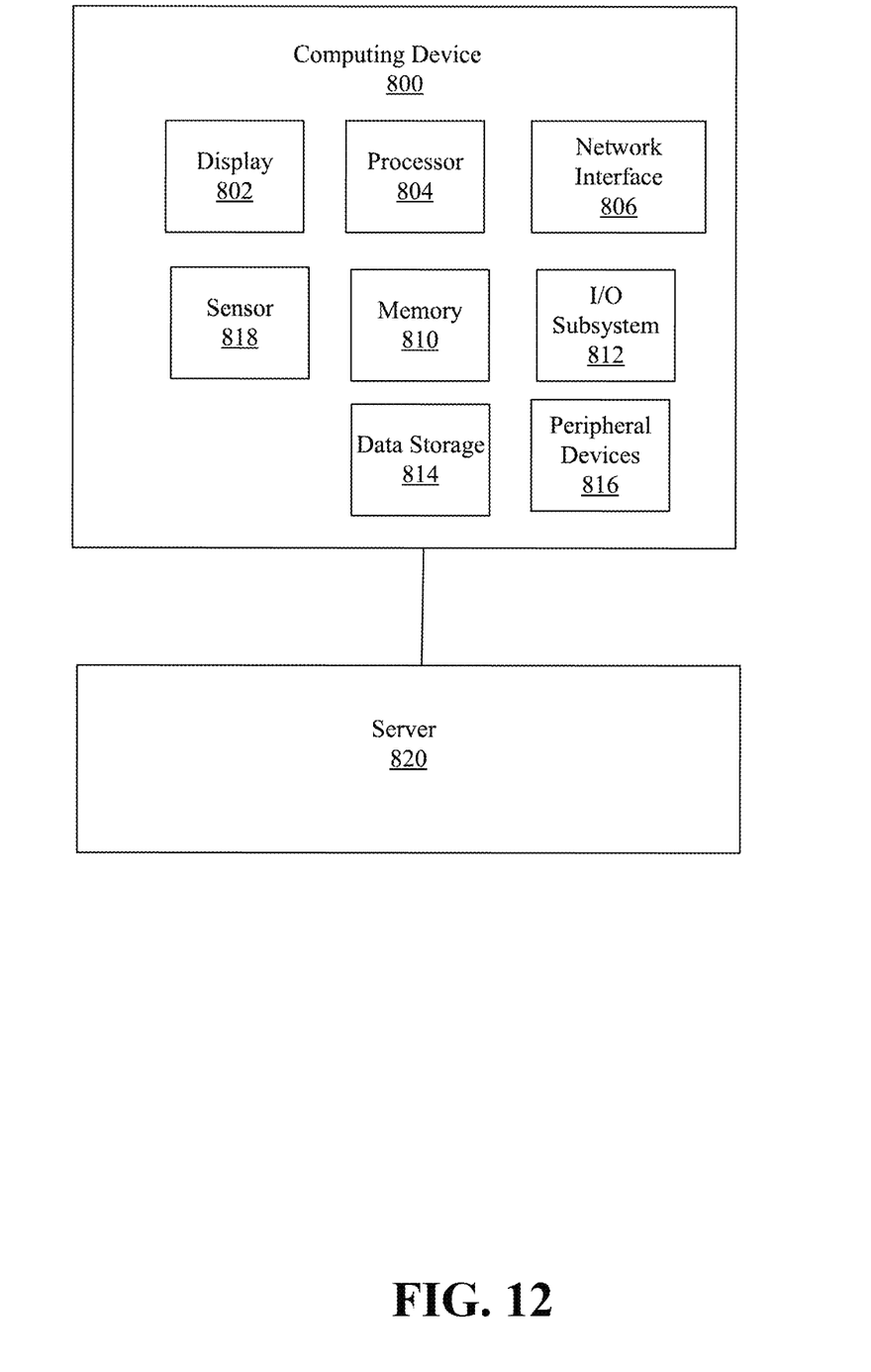
FIG. 12 is a block diagram of a computing device, in accordance with some embodiments.

FIG. 12 is a block diagram that illustrates a computing device 800 and server 820. The computing device 800 and/or server 820 may correspond to the computing device 104 of the process 100 of FIG. and in accordance with an embodiment. The computing device 800 may further implement any of the aspects described herein. The computing device 800 includes a processor 804, a memory 810, and a network interface 806.

The processor 804 includes suitable logic, circuitry, and/or interfaces to execute operations for facilitating electronic authentication and registration processes over the internet for example. The processor 804 performs such operations by means of hardware techniques, and/or under the influence of program instructions stored in the memory 810. Examples of the processor 804 include, but are not limited to, circuitry, an fixed application-specific integrated circuit (ASIC) processor, a reduced instruction set computing (RISC) processor, a complex instruction set computing (CISC) processor, a field-programmable gate array (FPGA), a graphics processing unit and the like.

The memory 810 includes suitable logic, circuitry, and/or interfaces to store information of authentication questions, challenges and responses. Examples of the memory 810 include a random-access memory (RAM), a read-only memory (ROM), a removable storage drive, a hard disk drive (HDD), a flash memory, a solid-state memory, and the like.

It will be apparent to a person skilled in the art that the scope of the invention is not limited to realizing the memory 810 in the computing device 800, as described herein. In another embodiment, the memory 810 may be realized in a form of a database server or a cloud storage working in conjunction with the computing device 800, without departing from the scope of the present invention.

The network interface 806 includes suitable logic, circuitry, and/or interfaces that transmits and receives data over communication networks using one or more communication network protocols under the control of the processor 804. The network interface 806 transmits/receives various requests and messages to/from various entities to retrieve data, for example from the server 820. Examples of the network interface 806 include, but are not limited to, an antenna, a radio frequency transceiver, a wireless transceiver, a Bluetooth transceiver, an ethernet port, a universal serial bus (USB) port, or any other device configured to transmit and receive data.

Additionally, in some embodiments, one or more of the illustrative components may be incorporated in, or otherwise form a portion of, another component. For example, the memory 810, or portions thereof, may be incorporated in the processor 804 in some embodiments. The computing device 800 may be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

The processor 804 may be embodied as any type of processor capable of performing the functions described herein. For example, the processor 804 may be embodied as a single or multi-core processor(s), digital signal processor, microcontroller, or other processor or processing/controlling circuit.

The memory 810 may be embodied as any type of volatile or non-volatile memory or data storage capable of performing the functions described herein. In operation, the memory 810 may store various data and software used during operation of the computing device 800 such as operating systems, applications, programs, libraries, and drivers. The memory 810 is communicatively coupled to the processor 804 via the I/O subsystem 812, which may be embodied as circuitry and/or components to facilitate input/output operations with the processor 804 the memory 810, and other components of the computing device 800.

The data storage device 814 may be embodied as any type of device or devices configured for short-term or long-term storage of data such as, for example, memory devices and circuits, memory cards, hard disk drives, solid-state drives, non-volatile flash memory, or other data storage devices. With respect to validation, the data storage device 814 may store data (e.g., computer code) to execute the processes and methods described herein. Alternatively, such data may be stored remotely. In some embodiments, the processor 804 or other hardware components may be configured to execute the processes and methods.

As shown, the computing device 800 may further include one or more peripheral devices 816. The peripheral devices 816 may include any number of additional input/output devices, interface devices, and/or other peripheral devices. For example, in some embodiments, the peripheral devices 816 may include a display, touch screen, graphics circuitry, keyboard, mouse, speaker system, microphone, network interface, and/or other input/output devices, interface devices, and/or peripheral devices. The computing device 800 may also perform one or more of the functions described in detail above.

As shown, the computing device 800 may further include a display 802. The display 802 may present details regarding various transactions to a user. The display 802 may further present an authentication process to a user, such as a challenge-response authentication process. The challenge-response authentication process may be presented as part of a webpage and/or application operating on the computing device 800.

The computing device 800 may also include a sensor 818 to track the user's responses during the authentication process. For example, the sensor 818 may be an imaging sensor that tracks a user's eyes and facial features. Imaging data generated by the sensor 818 may provided to the processor 804, that may detect characteristics of the user, such as movements in the eyes, positions of the eyes, point of gaze of the user, etc. The user may be authenticated based on the characteristics.

The computing device 800 may execute an authentication option provided by a vendor to merchants, and other interested parties, which leverages the computing device's 800 built in sensor 818 (which may have enhanced camera capabilities) and Augmented Reality software development kit to provide an end consumer with the ability to select responses to challenge question using their eyes and/or facial features. For example, an authentication system may be composed of at least two elements, such as SDKs (which may be offered to merchants to embed within their website or mobile application) in addition to an authentication engine which stores the challenge/response types for use across several challenge types and validates appropriate responses have been provided. In some embodiments, server 820 may transmit the SDKs, web pages, challenge/response type questions to the computing device 800 across a medium, such as the internet.

Techniques consistent with exemplary embodiments provide, among other features, systems and methods for processing payment transactions. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A computing device, comprising:
a network interface to transmit and receive data; and
a processor communicatively coupled to the network interface, the processor configured to:
provide images to a user;
learn first facial expressions of the user that are provided in response to the images;
generate a confidence indicating whether the first facial expressions are accurate by
presenting a test image to the user,
predicting, based on the first facial expressions, a test facial expression of the user that is predicted to be provided in response to the test image, and
verifying if the test facial expression is accurate;
determine that the confidence is above a threshold;
store the first facial expressions in association with the user in response to the confidence being above the threshold;
identify image data;
identify one or more of eye data or facial data from the image data, wherein the one or more eye data includes one or more of an eye movement of the user or a point of gaze of the user on a display, wherein the facial data is associated with a second facial expression of the user; and
determine whether to authenticate the user based on one or more of a comparison of the second facial expression and the first facial expressions, or the one or more of the eye movement or the point of gaze.

2. The computing device of claim 1, wherein the processor is further to:
identify the point of gaze from the image data; and
determine whether to authenticate the user based on a comparison of the point of gaze to a position on the display.

3. The computing device of claim 1, wherein the processor is further to:
cause the display to present an authentication image, wherein the authentication image is to be associated with the second facial expression.

4. The computing device of claim 1, wherein the processor is further to:
identify personal data associated with the user;
cause the personal data to be presented to the user on the display at a display position; and
authenticate the user based on the point of gaze and the display position.

5. The computing device of claim 1, wherein the processor is further to:
identify a path traced by the eye movement; and
determine whether to authenticate the user based on a comparison of the path to an expected path.

6. At least one non-transitory computer readable storage medium comprising a set of instructions, which when executed by a computing device, cause the computing device to:
provide images to a user;
learn first facial expressions of the user that are provided in response to the images;
generate a confidence indicating whether the first facial expressions are accurate by
presenting a test image to the user,
predicting, based on the first facial expressions, a test facial expression of the user that is predicted to be provided in response to the test image, and
verifying if the test facial expression is accurate;

determine that the confidence is above a threshold;
store the first facial expressions in association with the user in response to the confidence being above the threshold;
identify image data;
identify one or more of eye data or facial data from the image data, wherein the one or more eye data includes one or more of an eye movement of the user or a point of gaze of the user on a display, wherein the facial data is associated with a second facial expression of the user; and
determine whether to authenticate the user based on one or more of a comparison of the second facial expression and the first facial expressions, or the one or more of the eye movement or the point of gaze.

7. The at least one non-transitory computer readable storage medium of claim 6, wherein the instructions, when executed, cause the computing device to:
identify the point of gaze from the image data; and
determine whether to authenticate the user based on a comparison of the point of gaze to a position on the display.

8. The at least one non-transitory computer readable storage medium of claim 6, wherein the instructions, when executed, cause the computing device to:
cause an authentication image to be displayed to the user, wherein the authentication image is to be associated with the second facial expression.

9. The at least one non-transitory computer readable storage medium of claim 6, wherein the instructions, when executed, cause the computing device to:
identify personal data associated with the user;
cause the personal data to be presented to the user on the display at a display position; and
authenticate the user based on the point of gaze and the display position.

10. The at least one non-transitory computer readable storage medium of claim 6, wherein the instructions, when executed, cause the computing device to:
identify a path traced by the eye movement; and
determine whether to authenticate the user based on a comparison of the path to an expected path.

11. A method comprising:
providing images to a user;
learning first facial expressions of the user that are provided in response to the images;
generating a confidence indicating whether the first facial expressions are accurate by
 presenting a test image to the user,
 predicting, based on the first facial expressions, a test facial expression of the user that is predicted to be provided in response to the test image, and
 verifying if the test facial expression is accurate;
determining that the confidence is above a threshold;
storing the first facial expressions in association with the user in response to the confidence being above the threshold;
identifying image data;
identifying one or more of eye data or facial data from the image data, wherein the eye data includes one or more of an eye movement of the user or a point of gaze of the user on a display, wherein the facial data is associated with a second facial expression of the user; and
determining whether to authenticate the user based on one or more of a comparison of the second facial expression and the first facial expressions, or the one or more of the eye movement or the point of gaze.

12. The method of claim 11, further comprising:
identifying the point of gaze from the image data; and
determining whether to authenticate the user based on a comparison of the point of gaze to a position on the display.

13. The method of claim 11, further comprising:
identifying personal data associated with the user;
causing the personal data to be presented to the user on the display at a display position; and
authenticating the user based on the point of gaze and the display position.

14. The method of claim 11, further comprising:
identifying a path traced by the eye movement; and
determining whether to authenticate the user based on a comparison of the path to an expected path.

15. The computing device of claim 1, wherein:
to identify the one or more eye data or the facial data from the image data, the processor is to identify the facial data from the image data; and
to determine whether to authenticate the user, the processor is to compare the second facial expression to the first facial expressions.

16. The at least one non-transitory computer readable storage medium of claim 6, wherein:
to identify the one or more eye data or the facial data from the image data, the instructions, when executed, cause the computing device to identify the facial data from the image data; and
to determine whether to authenticate the user, the instructions, when executed, cause the computing device to compare the second facial expression to the first facial expressions.

17. The method of claim 11, wherein:
the identifying the one or more of the eye data or the facial data from the image data comprises identifying the facial data from the image data; and
the determining whether to authenticate the user includes comparing the second facial expression to the first facial expressions.

* * * * *